United States Patent [19]
Sherrard

[11] 3,983,404
[45] Sept. 28, 1976

[54] SURF-TURBINE GENERATING SYSTEM

[76] Inventor: William A. Sherrard, 25 S. Garfield St., Cleona, Pa. 17042

[22] Filed: Aug. 22, 1974

[21] Appl. No.: 499,559

[52] U.S. Cl. .................................. 290/53; 415/4; 417/330
[51] Int. Cl.² ............................................ F03B 13/10
[58] Field of Search .............. 290/1, 42, 43, 53, 54, 290/52; 417/330, 331, 332, 333, 334, 335, 336; 415/7, 4

[56] References Cited
UNITED STATES PATENTS

| | | | |
|---|---|---|---|
| 1,017,860 | 2/1912 | Dungan | 415/7 |
| 1,811,565 | 6/1931 | Schwabacher | 290/42 |
| 3,644,052 | 2/1972 | Lininger | 415/7 |
| 3,687,567 | 8/1972 | Lininger | 415/7 |
| 3,746,875 | 7/1973 | Donatelli | 290/42 |

Primary Examiner—Robert K. Schaefer
Assistant Examiner—John W. Redman
Attorney, Agent, or Firm—Rose & Edell

[57] ABSTRACT

An electrical generator is powered by the kinetic energy in ocean waves breaking at the shore. Waves are directed up an inclined surface through which an intake port is defined at a level substantially below the average wave height and extending across the entire length of the generator. Water entering the port is directed to drive the blades of a turbine located below the inclined surface but above the normal water level. Water overshooting the port is collected as it flows back down the surface by a second port which similarly feeds the water to drive the turbine. Water overshooting the top of the inclined surface is collected in a flow-reversing channel and likewise directed to drive the turbine. The system is mounted on wheels which are movable on rails extending from the ocean floor onto the beach, whereby the system can be moved to optimum position for different tidal conditions.

5 Claims, 2 Drawing Figures

SURF-TURBINE GENERATING SYSTEM

BACKGROUND OF THE INVENTION

The present invention relates to electric power generators and, more particularly, to the conversion of the kinetic energy of ocean waves into electrical power.

With present-day concern over both environmental pollution and conservation of energy resources, much thought has been given to new energy sources for electric power plants. Unfortunately, where pollution-free energy sources have been found in great supply, the apparatus required to efficiently produce electricity has proven to be either impractical or beyond the state of the art. With this in mind, I have given considerable thought to using the energy in ocean waves as a primary energy source. These waves are available in inexhaustible supply and can be utilized without polluting either the ocean or the air.

To be sure, the use of ocean waves in generating electric power has been suggested in the prior art. Such prior art systems have employed inclined walls extending above the ocean surface near the shore line. The walls are apertured so that wave water flowing up the incline can pass through the wall into a collecting vessel or cistern. Water thus collected is permitted to flow through an opening in the bottom of the vessel to drive a turbine or the like. The primary driving force for the turbine in such a system is thus derived from the potential energy or "head" of the collected wave water. Prior art systems of this type may be characterized as converting the kinetic wave energy into potential energy (i.e., pressure head) which is then converted to electrical energy. The conversion from kinetic to potential energy requires a rather large structure to store the collected water; in addition, energy loss by virtue of the conversion and by evaporation of the stored water is considerable.

In order to utilize wave energy whenever it is available, irrespective of tide level, it has been suggested in the prior art that the afore-mentioned wave-collecting generators be permitted to float. By so floating and if suitably anchored, the generator can more or less follow the tide. However, there is always the danger with this "floating" approach that the generator will break away from its anchor and either be lost or destroyed against rocks. Further, a structure which must store significant quantities of ocean water must be made of extremely light-weight material if it is to remain floating. Such material presents considerable structural problems, particularly where a turbine or the like must be supported and where current-carried ocean debris can be impacted against the structure.

It is therefore an object of the present invention to provide an electric power generator which operates directly from the kinetic energy of ocean waves.

It is another object of the present invention to provide an efficient, relatively inexpensive and pollution-free approach to generating electrical power.

It is still another object of the present invention to employ the energy from ocean waves in a new manner to efficiently generate electricity.

It is another object of the present invention to provide an electric power generator which is efficiently driven by the kinetic energy in ocean waves and which is readily positionable to operate at all tidal conditions without floating.

SUMMARY OF THE INVENTION

In accordance with the present invention, a generator for directly converting the kinetic energy of ocean waves into electricity is located proximate the shore line. An inclined surface extends upwardly toward the shore and includes a first intake port located at a height above the water level but below the height of the average wave. A portion of a wave flowing up the inclined surface is received by the first intake port and directed to drive the blades of turbine located below the inclined surface but above the water level. A second intake port is located on the incline slightly above the first port and is arranged to receive portions of the wave which flow back down the incline after overshooting the first port. The second port likewise directs flow into driving relationship with the turbine blades. If a portion of a wave overshoots the top of the inclined surface it is directed down through a receiving channel to likewise drive the turbine.

In order to optimally position the generator for varying tide levels, the generator is supported on wheels which are guided by tracks extending from beneath the water level to the beach. The generator may be moved along the tracks by automatic or manually-controlled means.

BRIEF DESCRIPTION OF THE DRAWINGS

The above and still further objects, features and advantages of the present invention will become apparent upon consideration of the following detailed description of one specific embodiment thereof, especially when taken in conjunction with the accompanying drawings, wherein.

DESCRIPTION OF THE PREFERRED EMBODIMENT

Figure 1:
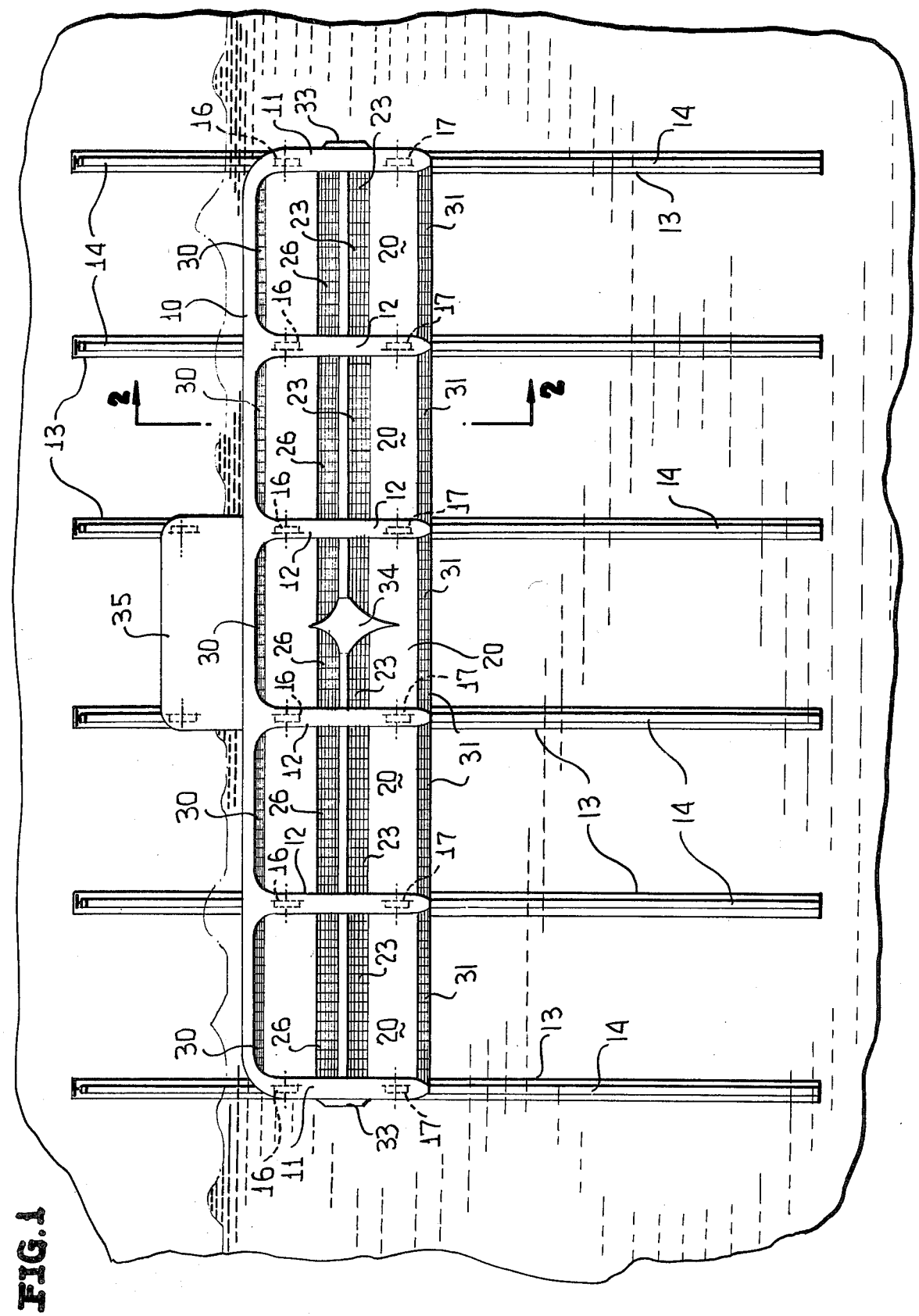
FIG. 1 is a top view in plan of a generator system according to the present invention.
Figure 2:
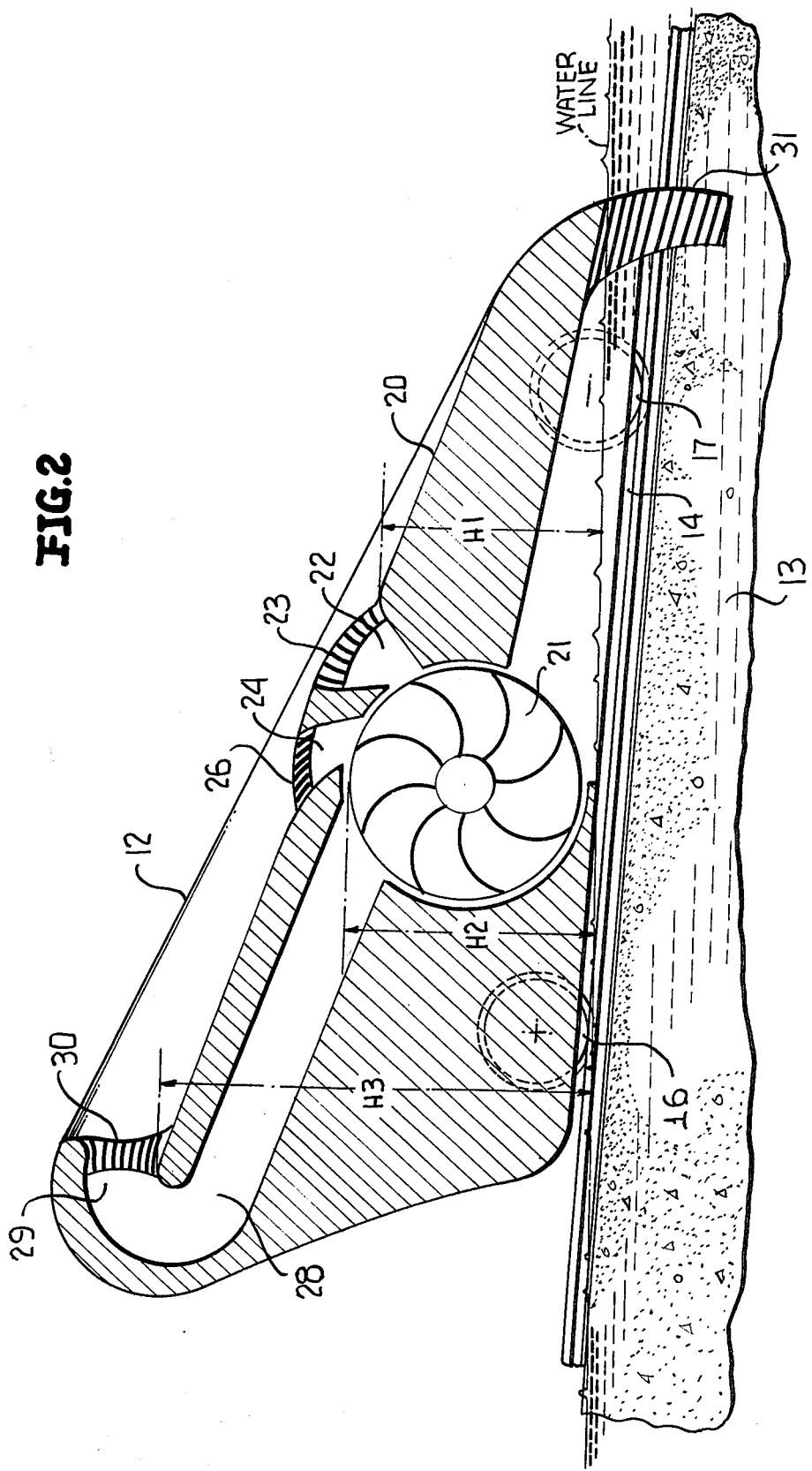
FIG. 2 is a side view in section taken along lines 2—2 of FIG. 1.

Referring in greater detail to FIGS. 1 and 2, the generator includes an elongated housing 10 adapted to extend parallel to the shore line. The housing is subdivided into a series of bays, adjacent bays being separated by parallel support walls 12. End walls 11 define respective ends of the housing and terminate the end bays.

A series of elongated concrete foundation strips 13 extend parallel to one another from the ocean to the beach or shore. These foundation strips are imbedded beneath the earth and extend in a direction perpendicular to the length of housing 10. Preferably, although not necessarily, each foundation strip 13 resides beneath a respective support wall 12 or end wall 11 of housing 10. A track or rail 14 is secured to and extends along the top of each foundation strip 13. Each rail 14 is engaged by a respective pair of aligned wheels 16, 17 located at the underside of housing 10 and permitting the housing to be moved towards and away from the shore along the rails.

Each bay includes an inclined top surface 20 which slopes upwardly out of the water toward the shore. A turbine 21 has its axis of rotation extending horizontally along the length of housing 10 beneath inclined surface 20 of all of the bays. The blades of the turbine, which may be crescent-shaped as illustrated, are normally disposed slightly above the normal water level.

An intake port 22 is defined through surface 20 at a height H1 above the normal water level which is considerably below the height of the average wave at the situs of the generator. Typically H1 would be approximately one-half the average wave height, but this is by no means a critical factor. A series of louvers 23 are disposed over the entrance to port 22 to prevent ocean debris from entering the port and to properly direct water flow into the port. The entering water flow is conducted by port 22 toward turbine 21 where it impinges against the turbine blades to drive the turbine in a clockwise direction (as viewed in FIG. 2). After driving the turbine blades, water from the wave drops into the water beneath housing 10.

Somewhat above port 22 on inclined surface 20, but nevertheless below the average wave height, a second intake port 24 is defined. Port 24, which is also covered by a series of louvers 26, is arranged to receive wave water which overshoots port 22 and flows back down inclined surface 20. Water so received is conducted toward the top of turbine 21 where it drives the turbine blades in the same direction as the driving force exerted by flow through port 22.

At the uppermost end of inclined surface 20 there is defined an inlet port 29 for a flow channel 28, port 29 also being covered by a series of louvers 30. Wave water reaching the top of surface 20 overflows into flow channel 28 which bends 180° to redirect the flow beneath surface 20 and toward turbine 21. Water egresses from channel 28 adjacent the upper one-third of the turbine where it drives the turbine blades in the same direction as does flow from ports 22 and 24. The height H3 of port 29 above the water level is preferably approximately equal to the height of the highest waves at the situs of the generator.

Flow from each of ports 22, 24 and 29, after driving the turbine blades, drops into the water beneath the open underside of housing 10. The water is then returned to the ocean through louvers 31 at the forward end of surface 20 which extends below the water level. Louvers 31 prevent boats, swimmers, and large debris from flowing beneath the turbine.

A flywheel housing 33 is mounted at each end of turbine 21 on each of end walls 11. Each housing 33 contains a conventional flywheel mechanism which serves to continue smooth turbine rotation during the time between ocean waves.

A gear housing 34 is mounted on housing 10 and contains gears which couple the rotational motion of turbine 21 in a wellknown manner to an electrical generator located in generator housing 35.

The turbine 21 is maintained above the normal water level by moving housing 10 along rails 14 as the tide changes. This may be done automatically under the control of a machine which is programmed according to the tidal schedule, or it may be done under manual control. In either use the turbine is not required to be driven while submerged.

In operation, as ocean waves near the shore they break in water, which is generally about four-thirds their own height at the breaking point, to form what is called surf. This surf has a strong landward vector of force and it is at that point that the tremendous wave energy is expended. This breaker is directed up the inclined surface 20, which is nominally at 20° relative to horizontal, although this is by no means a critical number. Some of the wave flows into the channeled intake port 22. The vertical height of port 22 is selected to be half the wave height in a preferred embodiment. As an example, if the highest waves or surf of the area measure four feet above the normal level of the water, the channeled intake port 22 might be 2.0 feet above the normal water level. The water entering port 22 is directed to the seaward side of a turbine 21. Likewise flow from the ports 24, 29 is directed against the turbine. Consequently, torque is applied to the turbine shaft. Horsepower is derived from the flow momentum of the waves acting over the entire length of the turbine.

Material composition of the system components is selected to withstand the corrosive effect of the salty environment. For example, the main housing 10, the louvers, and the turbine may be Fiberglas, specially treated steel, or some other strong yet corrosion-resistant material. The blades of the turbine may be rubber edges to increase the turbine's efficiency by allowing a closer fit with the turbine chamber linings; in addition this would facilitate clog-free operation by allowing objects to pass through that might otherwise become wedged. To compensate for times when this surf-turbine generating system is unable to generate electricity (e.g. lack of waves with sufficient force, maintenance, or repairs, etc.) power stored lithium-sulfur or some other efficient storage batteries may supply electrical demands until the system is back in generating operation. Once generating, the system can be used to recharge these storage batteries.

While I have described and illustrated specific embodiments of my invention, it will be clear that variations of the details of construction which are specifically illustrated and described may be resorted to without departing from the true spirit and scope of the invention as defined in the appended claims.

I claim:

1. In a generating system for deriving electricity from the kinetic energy in ocean waves, the combination comprising:

a housing adapted to be positioned in surf proximate the ocean shore;

a turbine located within said housing and including blades adapted to be rotatably driven by fluid flow about an axis extending generally parallel to the shore line;

positioning means for controllably moving said housing closer to and further from said shore, whereby to permit said turbine to be maintained entirely above the normal water level and to permit said housing to be impacted by ocean waves for substantially all tide levels;

an inclined surface of said housing directed upwardly toward said shore and positioned to be impacted by said ocean waves;

a first intake port defined through said inclined surface at a first level below the height of the average wave in said surf, said intake port being oriented to receive wave water flowing up said inclined surface and to direct wave water flow into driving relationship with said turbine blades such that turbine blades below said axis are driven in the same direction as waves approaching said shore;

a second intake port defined through said inclined surface at a level adjacent and above said first level, said second intake port being oriented to receive wave water flowing down said inclined surface from above said second level and to direct the received wave water against the turbine blades above said axis in a direction to aid the turbine drive imparted by flow through said first intake part;

a flow reversing channel having an inlet opening positioned proximate the upper end of said inclined surface to receive wave water overshooting said upper end, said inlet part being substantially higher and further downstream of the wave flow than said turbine, said channel being oriented to direct wave water received by said inlet port back down toward the turbine to impact against turbine blades above said axis in a direction which aids turbine drive imparted by flow through said first and second intake ports; and wherein said housing includes a vent opening leading from generally below said turbine for permitting wave water used to drive said turbine to at all times drop back into the ocean beneath said housing.

2. The combination according to claim 1 further characterized in that said positioning means comprises:
a plurality of rails extending parallel from beneath the surf onto the shore; and
wheels secured to said housing and adapted to rollably engage said rails.

3. The combination according to claim 2 further characterized by flywheel means connected to said turbine to maintain smooth rotational motion of said turbine during the interval between ocean waves.

4. The combination according to claim 2 wherein said rails are mounted on respective concrete foundation strips inbedded in the earth.

5. The system according to claim 1 further comprising louvers of corrosion-resistant material located at each of said first and second intake ports and the inlet opening of said flow reversing channel for directing wave water toward said turbine and for blocking ocean debris from entering said housing.

* * * * *